United States Patent [19]

Moore

[11] 4,080,925
[45] Mar. 28, 1978

[54] PORTABLE SURFACE WIND INDICATOR

[75] Inventor: Robert Edwin Moore, Lakeside, Calif.

[73] Assignee: General Dynamics Corporation Electronics Division, San Diego, Calif.

[21] Appl. No.: 777,023

[22] Filed: Mar. 14, 1977

[51] Int. Cl.² ............................................. G01F 15/00
[52] U.S. Cl. ................................ 116/117 R; 116/173
[58] Field of Search ............. 73/188; 116/117 R, 173; 46/53, 58, 74 D, 86 A

[56] References Cited

U.S. PATENT DOCUMENTS

| 51,615 | 12/1917 | Stacey | 116/173 |
|---|---|---|---|
| 903,879 | 11/1908 | Nusly | 46/58 |
| 1,580,601 | 4/1926 | Hugill | 46/53 |
| 3,046,934 | 7/1962 | Swezy | 116/173 |
| 3,067,717 | 12/1962 | Imparato | 116/173 |
| 3,234,903 | 2/1966 | Vara | 116/173 |

Primary Examiner—Anthony V. Ciarlante
Attorney, Agent, or Firm—Brown & Martin

[57] ABSTRACT

A resuable portable wind indicator comprises a central body member having four elongated arms extending radially outward therefrom at equal angles of 120 degrees from adjacent arms and connected to the central body member by coil springs, with each arm including a ribbon or the like at the outer end thereof. The outwardly extending arms can be folded up in one direction for packaging in a small container and, when released from an aircraft or the like, will spring outward such that when the indicator lands one arm will be extended in the upward direction such that the ribbon or flag on the end thereof will be blown by the wind in the direction of the wind. The radial arms are mounted by means of coil springs through a central body which may either consist of a spherical member with radial bores for threadably receiving the springs, or a radially extending plurality of studs for threadably receiving the coil springs.

9 Claims, 4 Drawing Figures

PORTABLE SURFACE WIND INDICATOR

BACKGROUND OF THE INVENTION

The present invention relates generally to signaling devices and pertains particularly to a portable reusable wind indicator.

Aircraft which operate in remote locations such as for surveying military and emergency use must frequently land in areas not having an airport. Such aircraft may land in small clearings having a length that is marginal for the aircraft to land and take off. In such situations it is critical that the direction of the wind be known to the pilot so that he may land into the wind. Such wind direction is also critical for helicopters.

Heretofore, the usual approach to determine the wind direction if no natural means are available is the use of smoke bombs. A smoke bomb dropped into a clearing will give off smoke which is blown in the direction which the wind is traveling. Such action, however, is hazardous in military operations because it can signal the enemy as to the location of the aircraft. In other operations such as in remote wilderness operations such smoke bombs can start forest fires.

Accordingly, it is desirable that some inexpensive and reliable nonhazardous means be available for indicating wind direction in remote locations.

SUMMARY AND OBJECTS OF THE INVENTION

Accordingly, it is the primary object of the present invention to overcome the above problems of the prior art.

Another object of the present invention is to provide portable reliable wind indicator means that can be dropped from aircraft in remote locations.

In accordance with the primary aspects of the present invention, a portable surface wind indicator comprises central body means with outwardly extending arms having wind indicating means on the outer end of each of the radially extending arms with the arms so positioned and arranged that when the indicator is dropped from aircraft or the like, it will land with one arm always extending in a vertical direction.

BRIEF DESCRIPTION OF THE DRAWING

The above and other objects and advantages of the present invention will become apparent from the following description when read in conjunction with the drawing, wherein.

DETAILED DESCRIPTION OF PREFERRED EMBODIMENTS

Figure 1:
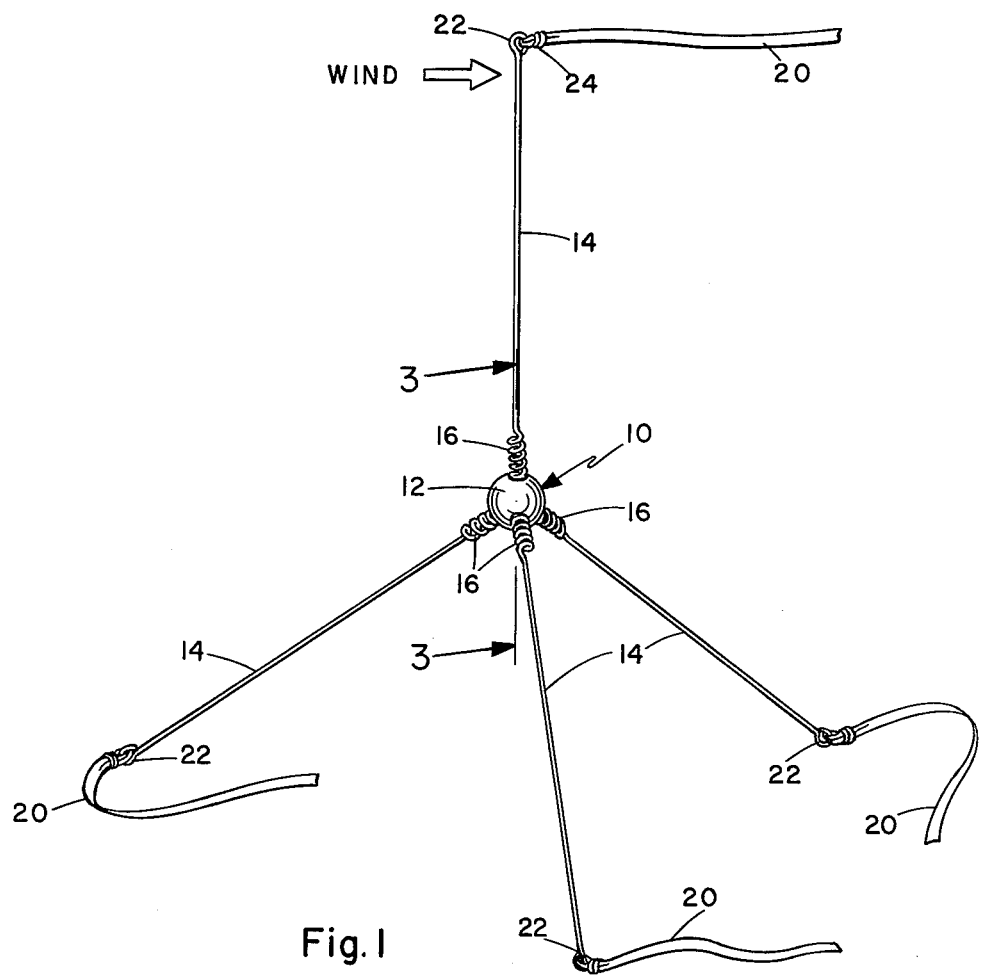
FIG. 1 is a perspective view of a wind indicator in accordance with the present invention.

Turning now to the drawings, particularly FIG. 1, there is illustrated a portable surface wind indicator designated generally by the numeral 10 and comprising a central body member 12 which, as illustrated, is of a generally spherical configuration. A plurality of identical arms 14 are resiliently mounted to the central body portion 12 and extend radially outwardly therefrom at equal angles of 120 degrees with respect to each adjacent such arm. These arms may be constructed of any suitable material such as thin, rigid, or spring wires, each having an inner coiled spring end 16 threadably engaging like threaded bores or sockets 18 formed in the central spherical body member 12. The arms or legs as they may be called 14 may be easily and conveniently inserted in and removed from the body portion 12 simply by threaded engagement of the ends thereof with the sockets.

The legs or arms 14 each extend outwardly and include suitable wind indicating means 20, such as a ribbon, flag, or the like attached to the outer end thereof. A ribbon 20, for example, may be attached in a loop 22 at the outer end thereof by suitable means such as a knot or the like 24. The ribbons 20 are preferrably of a bright color contrasting with the surface terrain so that they may be easily seen from the air. For example, different colored ribbons may be provided for different colored terrains thus providing maximum visibility.

The spacing of the legs are such that when the device is dropped from an aircraft or the like, it will always land supported on three legs as indicated with the fourth leg extending upward into the air thus freeing the ribbon 20 for wind indication.

Figure 2:
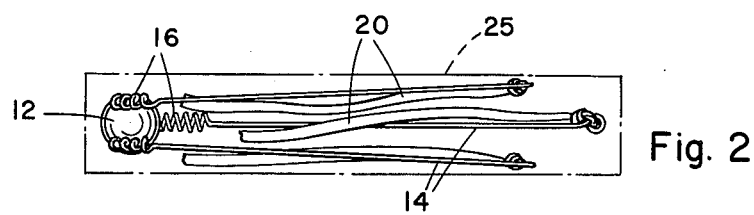
FIG. 2 shows the indicator in folded position, with a container indicated in broken line.
Figure 3:
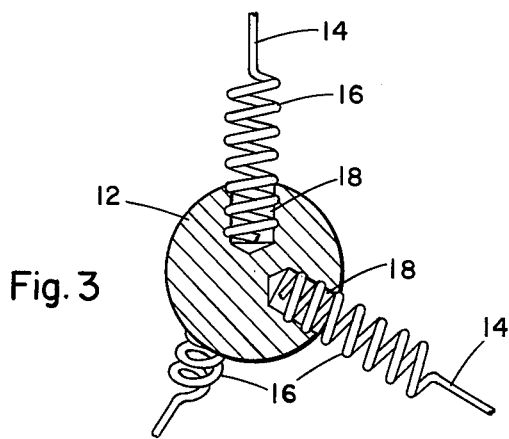
FIG. 3 is an enlarged sectional view taken on line 3—3 of FIG. 1.

The resilient mounting of the legs or arms 14 to the central body member is such that the device may be folded as shown in FIG. 2 with the legs extending in a single direction and packaged within a container such as a tube 25 or the like. As soon as the device is removed from the tube or container, the legs spring outwardly in the direction as shown in FIG. 1 for landing upright as indicated. Thus the device may be easily packaged in tubes or the like and carried on aircraft or the like for ease of use. When the indicator is needed it is simply removed from its container and tossed or ejected from the aircraft landing in a position as shown in FIG. 1. The device may then be retrieved and reused.

Figure 4:
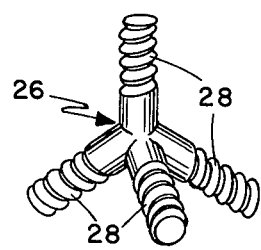
FIG. 4 is a perspective view of an alternate construction of the body portion of the device.

Turning now to FIG. 4, an alternate construction of the central body member is illustrated. In this embodiment, the central body member 26 includes a plurality of identical radially extending studs 28 extending at equal angles from each other of 120°. These studs are threaded to receive the screw spring ends 16 of the legs 14.

Thus from the above, it is seen that I have provided a novel, reusable and portable surface wind indicator that is simple and easy to manufacture and simple and convenient to use. Moreover, the device is safe and easy to use without the danger of forest fires or the like.

While I have described and illustrated my invention by means of specific embodiments, it is to be understood that numerous changes and modifications may be made therein without departing from the spirit and scope of the invention as defined in the appended claims.

Having described my invention, I now claim:

1. A portable surface wind indicator comprising:
    a central body member,
    four elongated arms mounted on and extending outwardly from said central body member at equal angles of 120° between any two of said elongated arms, and
    wind responsive indicating means mounted on the outer end of each of said elongated arms for extending outwardly therefrom in response to wind acting thereon for indicating wind direction.

2. The wind indicator of claim 1, comprising:

resilient biasing means connecting each of said elongated arms to said central body member so that all of said arms can be folded and retained in the same direction from said body member, said resilient biasing means biasing said arms toward the position of equal angles.

3. The wind indicator of claim 1, wherein said wind responsive indicating means comprises a ribbon.

4. The wind indicator of claim 1, wherein said central body member is spherical in configuration.

5. The wind indicator of claim 1, wherein said central body member includes four radially extending threaded studs, and said radial arms are connected to said studs by coil springs threadably engaging said studs.

6. The wind indicator of claim 4, wherein said central body member includes four radially extending threaded bores, and
 a coil spring threadably engaging each of said bores for mounting said radially extending arms.

7. The wind indicator of claim 6, wherein each of said arms comprises an spring steel rod having one end coiled for defining said coil spring and a loop on the other end for mounting a ribbon for defining said wind responsive means.

8. The wind indicator of claim 5, wherein said arms are defined by elongated spring steel rods formed at one end with coils defining said coil springs.

9. The wind indicator of claim 8, wherein the outer end of each of said arm includes a loop and a ribbon mounted in said loop for defining indicator means.

* * * * *